(12) United States Patent
Behar et al.

(10) Patent No.: US 10,943,055 B1
(45) Date of Patent: Mar. 9, 2021

(54) SYSTEMS AND METHODS FOR TEMPLATED, CONFIGURABLE, RESPONSIVE CONTENT ITEMS

(71) Applicant: Google LLC, Mountain View, CA (US)

(72) Inventors: Cameron Henry Behar, Venice, CA (US); Mariam Rahila Shaikh, San Francisco, CA (US); Brian James Mulford, Palos Verdes, CA (US); Jonathan Wolfe, Pasadena, CA (US); Robert Neale, Los Angeles, CA (US); Wade Davenport Norris, Los Angeles, CA (US); Robert Gordon Kogan, Pasadena, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 15/959,113

(22) Filed: Apr. 20, 2018

Related U.S. Application Data

(63) Continuation of application No. 14/577,514, filed on Dec. 19, 2014, now Pat. No. 9,953,009.

(51) Int. Cl.
   *G06F 40/106* (2020.01)
(52) U.S. Cl.
   CPC ................ *G06F 40/106* (2020.01)
(58) Field of Classification Search
   CPC .. G06F 17/248; G06F 17/212; G06F 17/2247; G06F 17/30905; G06F 40/106; G06F 16/9577; G06F 2200/1614; G06F 40/186; G06F 40/14; G06F 40/103; G06F 3/04845; G06F 3/04886; G06F 40/117
   See application file for complete search history.

(56) References Cited

U.S. PATENT DOCUMENTS

| | | | |
|---|---|---|---|
| 6,313,835 B1 * | 11/2001 | Gever | G06F 16/958 715/846 |
| 7,356,332 B2 | 4/2008 | Pell et al. | |
| 7,558,748 B2 * | 7/2009 | Ehring | G06F 40/12 705/26.9 |
| 8,810,512 B2 | 8/2014 | Andersson et al. | |
| 8,812,951 B1 | 8/2014 | White | |
| 9,003,309 B1 * | 4/2015 | Venkateshamurthy | G06F 40/14 715/760 |

(Continued)

OTHER PUBLICATIONS

U.S. Notice of Allowance on U.S. Appl. No. 14/577,514 dated Dec. 19, 2017.

(Continued)

*Primary Examiner* — Wilson W Tsui
(74) *Attorney, Agent, or Firm* — Foley & Lardner LLP

(57) ABSTRACT

System and methods for displaying one or more assets on a client device based on device characteristics are provided. Code is transmitted to a client device. The code, when executed by the client device, causes a processor of the client device to determine a first device characteristic of the client device. A first layout may be selected based on the first device characteristic. The layout may include one or more cards. Each card may correspond to one or more assets. Each card may be modified based on a corresponding card characteristic. One or more assets may be requested. The assets may be displayed on the first client device. The code may be transmitted to another client device, which may select a different layout based on a different device characteristic.

20 Claims, 6 Drawing Sheets

(56) References Cited

U.S. PATENT DOCUMENTS

| | | | |
|---|---|---|---|
| 9,317,302 B2 | 4/2016 | Hunt et al. | |
| 2003/0135638 A1* | 7/2003 | Brabson | H04L 41/5025 709/232 |
| 2006/0103891 A1 | 5/2006 | Atkins | |
| 2006/0232573 A1 | 10/2006 | Nitta et al. | |
| 2007/0004451 A1* | 1/2007 | C. Anderson | G06F 1/1626 455/556.1 |
| 2008/0082911 A1* | 4/2008 | Sorotokin | G06F 40/14 715/236 |
| 2008/0139191 A1* | 6/2008 | Melnyk | H04L 67/2823 455/419 |
| 2008/0165152 A1* | 7/2008 | Forstall | G06F 1/1626 345/173 |
| 2010/0083163 A1* | 4/2010 | Maghoul | G06F 1/1626 715/781 |
| 2011/0185040 A1 | 7/2011 | Schmidt | |
| 2013/0021377 A1* | 1/2013 | Doll | G09G 5/14 345/649 |
| 2013/0033523 A1* | 2/2013 | Stovicek | G06F 40/197 345/649 |
| 2013/0091462 A1 | 4/2013 | Gray et al. | |
| 2013/0229406 A1* | 9/2013 | Elyada | G06Q 30/02 345/419 |
| 2014/0092125 A1 | 4/2014 | Max et al. | |
| 2014/0137020 A1 | 5/2014 | Sharma et al. | |
| 2014/0351268 A1* | 11/2014 | Weskamp | G06F 16/24578 707/748 |
| 2015/0019957 A1* | 1/2015 | Ying | G06F 40/106 715/243 |
| 2015/0082180 A1 | 3/2015 | Ames et al. | |

OTHER PUBLICATIONS

U.S. Office Action on U.S. Appl. No. 14/577,514 dated Nov. 28, 2016.

U.S. Office Action on U.S. Appl. No. 14/577,514 dated Jun. 28, 2017.

* cited by examiner

SYSTEMS AND METHODS FOR TEMPLATED, CONFIGURABLE, RESPONSIVE CONTENT ITEMS

CROSS-REFERENCES TO RELATED APPLICATIONS

The present application claims the benefit of priority under 35 U.S.C. § 120 as a continuation of U.S. Pat. Application No. 14/577,514, filed Dec. 19, 2014, which is hereby incorporated by reference herein in its entirety.

BACKGROUND

This document relates to displaying content on client devices.

SUMMARY

In a computerized content delivery network, first-party content providers can provide information for presentation of resources, such as web pages, documents, applications, and/or other resources. Additional third-party content can be presented on a client device together with the first-party content. Thus, a client device may access and display first-party content that is the subject of the resource as well as the third-party content that may or may not be related to the subject matter of the resource. Certain third-party content may link the client device to another resource different from the resource originally provided by the first party. Different client devices may have different characteristics. Client devices may have varying screen sizes, resolutions, available inputs, etc. Some resources and content items designed for one screen size may appear incorrectly on a client device having a different screen size.

One implementation of the present disclosure is a computer-implemented method for transmitting code to client devices to display one or more assets based on device characteristics. The method includes transmitting a code to a first client device. The first client device may execute the code and determine a first device characteristic of the first client device. Based on the first device characteristic, the first client device selects a first layout. The first layout may include a first card and a second card, where the first card corresponds to a first card characteristic and the second card corresponds to a second card characteristic. The first client device may modify the first card based on the first card characteristic and the second card based on the second card characteristic. After modifying the first card and the second card, the first client device may request the first asset and the second asset. Then the first client device may display the first asset based on the first card characteristic and the second asset based on the second card characteristic. The method further includes transmitting the code to a second client device. The second client device may execute the code and determine a second device characteristic of the second client device. Based on the second device characteristic, the second client device may select a second layout that includes a first card and a third card. The first card may correspond to a first asset and the third card may correspond to a third asset. The second client device may modify the first card based on the first card characteristic, and the third card based on a third card characteristic. The second client device may request the first asset and the third asset. The second client device may display the first asset based on the first card characteristic and the third asset based on the third card characteristic.

Another implementation of the present disclosure is a system for transmitting code to client devices to display one or more assets based on device characteristics. The system includes a computing device that transmits code to a first client device. The first client device may execute the code and determine a first device characteristic of the first client device. The first client device may include a first layout selector that selects a first layout based on the first device characteristic. The first layout may include a first card and a second card, where the first card may correspond to a first asset and the second card may correspond to a second asset. The first client device may also include a first card modifier. The first card modifier may modify the first card based on a first card characteristic and the second card based on a second card characteristic. After modifying the first card and the second card, the first client device may request the first asset and the second asset. The first client device further include a first rendering engine that may display the first asset based on the first card characteristic and the second asset based on the second card characteristic. The computing device of the system may also transmit the code to a second client device. The second client device may execute the code and determine a second device characteristic. Based on the second device characteristic, a second layout selector of the second client device may select a second layout. The second layout may include the first card and a third card. The first card may correspond to the first asset and the third card may correspond to a third asset. A second card modifier of the second client device may modify the first card based on the first card characteristic and the third card based on a third card characteristic. The second client device may then request the first asset and the third asset. A second rendering engine on the second may display the first asset based on the first card characteristic and the third asset based on the third card characteristic.

BRIEF DESCRIPTION OF THE DRAWINGS

Those skilled in the art will appreciate that the summary is illustrative only and is not intended to be in any way limiting. The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Figure 1:
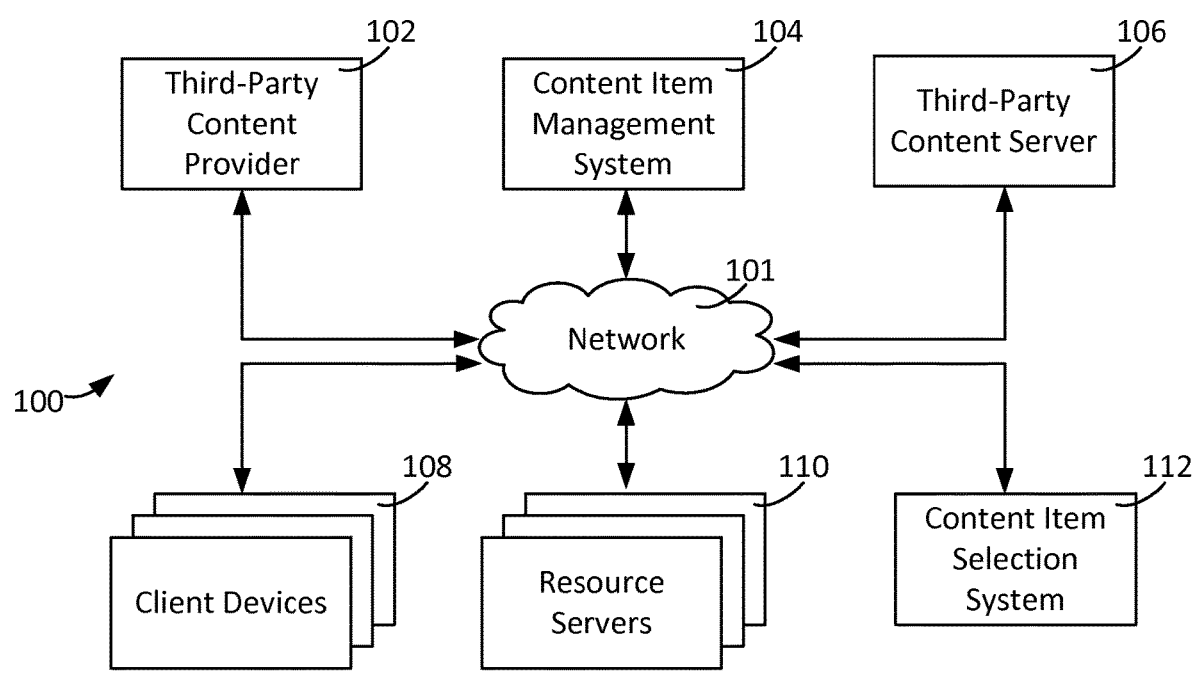
FIG. 1 is a block diagram of a computer system including a network, third-party content provider, content item management system, third-party content server, client devices, resource servers, and content item selection system, according to a described implementation.

FIG. 1 is a block diagram of a computer system 100 including a network 101, third-party content provider 102, content item management system 104, third-party content server 106, client devices 108, resource servers 110, and content item selection system 112.

The system 100 may use at least one computer network 101. The network 101 may include a local area network (LAN), wide area network (WAN), a telephone network, such as the Public Switched Telephone Network (PSTN), a wireless link, an intranet, the Internet, or combinations thereof. The network 101 may connect one or more devices via an Open Systems Interconnection (OSI) model. In some implementation, the network 101 may use an internet protocol suite, including the Transmission Control Protocol (TCP) and the Internet Protocol (IP).

The third-party content provider 102, content item management system 104, third-party content server 106, one or more client devices 108, one or more resource servers 110, and content item selection system 112 may each be a computing device. A computing device (e.g. a data processing system) may include one or more processors, memory, and network interface. The one or more processors may be configured to execute instructions stored in a memory device to perform one or more operations described herein. The one or more processors and the memory device may form a processing module. The processor may include a microprocessor, a general purpose processor, an application-specific integrated circuit (ASIC), a field-programmable gate array (FPGA), a data processor, a logic devices, a central processing unit (CPU), a graphics processing unit (GPU), a group of processing components, other suitable electronic processing components, or combinations thereof. The processor may be connected directly or indirectly (e.g. via a bus) to the memory and the network interface. The memory may include, but is not limited to, any type of volatile, non-volatile memory, media, memory device, electronic, optical, magnetic, semiconductor memory device, or any other storage or transmission device capable of providing processor with program instructions and/or data. The memory may include a floppy disk, compact disc read-only memory (CD-ROM), digital versatile disc (DVD), magnetic disk, hard disks, internal disks, removable disks, magneto-optical disks, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions and/or data. The instructions may include code and/or data from any suitable computer programming language (including scripting language or markup language) such as, but not limited to, ACTIONSCRIPT®, C, C++, C #, Cascading Style Sheets (CS S), DART®, ECMASCRIPT®, Extensible Markup Language (XML), JAVA®, JAVASCRIPT® including JAVASCRIPT® Object Notation (JSON), PERL®, Hyptertext Markup Language (HTML), PYTHON®, TypeScript, VBScript, VISUAL BASIC®, or any other language. In addition to the processing circuit, a computing device may include one or more databases configured to store data. A data storage device may be connected to a computing device through the network 101. The computing device may include input and/or output (e.g., an electronic display, a touch screen, a virtual reality display, a speaker, a keyboard, a pointing device, a mouse, a microphone, a printer, a gamepad, etc.). The computing device may be connected to the network 101 via a network interface. The network interface may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems via the network 101 The network interface 405 may have a corresponding module or software that works in conjunction with hardware components. The network interface may allow a computing device to communicate with and exchange data with other computing devices via the network 101. The network interface may receive data from or transmit data to the processor, memory, and/or any module or application in memory.

A third-party content provider 102 may be a computing device operated by an advertiser or any other content provider. The third-party content provider 102 may communicate with and provide a content item to the content item management system 104. In some implementations, the third-party content provider 102 may provide one or more assets (e.g. creatives) that are used for a content item. The third-party content provider 102 may provide a plurality of assets, and each asset may be of an asset type and size. An asset may be any format that may be present on a client device 108. An asset may be specified as one of different format or type, such as text, image, animation, video, multimedia, rich-media content, streaming audio/video source, map, link, FLASH® assets, applications, contact information, social feed, etc., or any combination. An asset may be any other format or hybrid of formats that may be presented on a client device 108. In some implementations, the third-party content provider 102 may provide a priority for each asset. For instance, an asset that is an image of a logo may have a high priority. The third-party content provider 102 may provide links, e.g. uniform resource locator (URL), to an asset or a creative. In some implementations, the third-party content provider 102 may provide or select one or more layouts associated with a content item. In some implementations, the third-party content provider 102 may provide or select a theme associated with the content item or with the layout. In some implementations, the third-party content provider 102 may provide or select one or more cards of a layout. In some implementations, the third-party content provider 102 may provide or select one or more card characteristics of a card. In some implementations, the third-party content provider 102 may provide or select a link associated with a card. In some implementations, the third-party content provider 102 may provide or select an asset or a creative associated with a card and/or a layout. In some implementations, the third-party content provider 102 may provide a link to a resource, e.g. a landing page.

The third-party content provider 102 may connect with the content item management system 104 to manage the selection and serving of content items by content item selection system 112. For instance, the third-party content provider 102 may set bid values and/or selection criteria via an interface that may include one or more content item conditions or constraints regarding the serving of content items. A third-party content provider 102 may specify that a content item and/or a set of content items should be selected for and served to client devices 108 having device identifiers associated with a geographic location or region, a language, an operating system, a web browser, etc. In another implementation, the third-party content provider 102 may specify that a content item or set of content items should be selected and served when a resource, such as a web page, document, an application, etc., contains content item that matches or is related to certain keywords, phrases, etc. The third-party content provider 102 may set a single bid value for several content items, set bid values for subsets of content items, and/or set bid values for each content item. The third-party content provider 102 may also set the types of bid values, such as bids based on whether a user clicks on the third-party content item, whether a user performs a specific action based on the presentation of the third-party content item, whether the third-party content item is selected and served, and/or other types of bids.

The content item management system 104 can communicate, via the network 101, with the third-party content provider 102, the third-party content server 106, and the content item selection system 112. The content item management system 104 may receive the content item from the third-party content provider 102 or generate the content item. The content item specified in the content item management system 104 may be one or more of a banner content item, interstitial content item, pop-up content item, rich media content item, hybrid content item, FLASH® content item, cross-domain iframe content item, etc. The content item management system 104 may store the content item in memory and/or one or more databases. The content item management system 104 may provide the content item to the third-party content server 106 via the network 101. The content item management system 104 may send auction values used for selection of content item to the content item selection system 112. The content item management system 104 may be combined with or include one or more of the third-party content server 106, the content item selection system 112, or the resource server 110.

The content item, specified on the content item management system 104, may include one or more layouts, cards, and assets. The content items, layouts, cards, and assets may be organized in a hierarchical structure. For instance, the content item may include one or more layouts. Each layout may include one or more cards. Each card may include one or more assets.

The content item may comprise one or more layouts. Each of the one or more layouts may correspond to a characteristic of a client device 108. For instance, a content item may comprise two layouts. A first layout may correspond to a client device characteristic of a screen less than 480 pixels wide. A second layout may correspond to a client device characteristic of a screen greater than 480 pixels wide. Each layout may correspond to an invitation state or an expanded state.

A layout may be generated from a template, such as a multi-video template, catalog template, magazine template, mixed-content template, primary-secondary template, a primary-secondary-tertiary template, a thumbnail template, a map template, or a product template. In a multi-video template, each card may include a video asset. In some instances, a card may be associated with a plurality of videos, e.g. a scrollable list of videos. In a catalog template, one or more cards may comprise one or more catalog identifiers which may be associated with an image, link, rich-media content, etc., such that each catalog identifier may be associated with an item for sale in a catalog. In a magazine template, one or more cards may be associated with images, text, rich-media content, links, etc., such that each card may be associated with a page, an article, a product, etc. of a magazine. In a mixed-media content template, two or more cards of the mixed-content template may be associated with different types of assets. For instance, one card may be associated with a video asset and another card may be associated with an image asset. In a primary-secondary template, a primary card may be sized bigger than a secondary card and placed in a more prominent position, e.g. at the top, to the left, etc. In some implementations, the primary card may also have a focus over the secondary card, such that a video asset associated with the primary card that has the focus may play while a video asset associated with the secondary card may be paused. In a primary-second-tertiary template, a primary card may be sized bigger than a secondary card, and the secondary card may be sized bigger than a tertiary card. In a thumbnail template, a plurality of secondary cards, e.g. thumb cards, may be associated with a thumbnail image and a primary card may be associated with an image corresponding to one of the thumbnail images. In some instances, each thumbnail image may be associated with an asset, and a selection of one of the thumbnail image may display the associated asset on the primary card. In a map template, one or more cards may be associated with a map asset and specify an address, name of a business, operating hours, phone number, directions, etc. In a product template, one or more cards may be associated with an item for sale.

Each card may also correspond to one or more assets provided or specified by the third-party content provider 102. In some implementations, in response to receiving one or more assets from the third-party content provider 102, the content item management system 104 may generate a content item (e.g. from a template) comprising one or more layouts. In some implementations, the content item management system 104 may receive a selection of one or more layouts. In some implementations, the content item management system 104 may select from one or more assets, e.g. creative, received from the third-party content provider 102, to associate with one or more layouts. For instance, the content item management system 104 may select assets based on corresponding priority of each asset. In some implementations, the content item management system 104 may select one or more cards responsive to receiving one or more assets from the third-party content provider 102. The content item, layouts, and/or cards may specify a format or type of the one or more assets.

Each of the layouts may comprise one or more cards that comprise one or more card characteristics, e.g. a card type, size, position, asset type, and configuration. The card type may indicate that the card is a brand card, a thumbnail card, a primary card, a secondary card, or any other card type. A brand card may be, for instance, card associated with an asset type of an image. In some layouts, the brand card may be displayed as long as the device is displaying the device. The card type and/or the asset type may indicate, for instance, that the card includes a video asset. The card type may specify that the card includes a plurality of assets. The configuration may specify that the card is scrollable if the card includes a plurality of assets. The configuration may specify an aspect ratio for the card or a range of allowable aspect ratios for the card. For instance, the card may comprise a video asset, and the aspect ratio based on the aspect ratio of the video asset. The configuration may specify an orientation of the card.

In some implementations, the content item management system 104 may receive one or more card characteristics, layout characteristics, and/or predefined settings. A predefined setting (e.g. a predefined card setting, a predefined layout setting) may include size, dimensions, theme, color, accent color, background image, opacity, etc. The predefined setting may be defined or selected by the third-party content provider 102 such that the predefined settings will apply to each layout and/or to each card. The predefined setting may define a range of allowable values, for instance, the range of allowable dimensions for a layout or a card. For instance, a predefined setting may define a minimum allowable dimension of a card to be 480 pixels.

The layout, card, and/or asset may be interactive. Based on input of a client device 108, a layout may be changed or modified (or a new layout may be selected) to display the content item on the client device 108. In some implementations, based on input of a client device 108, one or more cards may be modified for display on the client device 108. In some implementations, based on input of a client device 108, one or more assets may be modified for display on the client device 108. In some implementations, the one or more layouts, cards, and assets may be associated with one or more links and/or characteristics. A layout, card, or asset may be associated with a link that directs the client device 108 to a resource. In some implementations, based on input of a client device 108, the layout, card, or asset may redirect the device 108 to a resource.

In some implementations, a content item may include an invitation state and an expanded state. For instance, an invitation state may be associated with one layout, and an expanded state may be associated with another layout. In some implementations, a template may comprise an invitation state and an expanded state. The invitation state may initially be selected for a content item, and upon receiving an input of a client device 108, the layout associated with the expanded state may be selected. In some implementations, an invitation state may comprise less number of cards than an expanded state. In some implementations, an invitation state may take up part of a display of a device, while the expanded state may take up larger portion of the display of the device (e.g. the entire display). For instance, the invitation state may be displayed within a webpage, and once a user clicks on the content item, the expanded state may be displayed upon a greater part of the display of the device compared to the invitation state, e.g. the entire display.

The content item, specified on the content item management system 104, may include code. In some implementations, the content item management system 104 may receive, generate, and/or associate code with the content item. The code of the content item may be written in any programming or scripting language that can be executed on a device. The code may be in ACTIONSCRIPT®, DART®, HTML, JAVASCRIPT®, PYTHON®, Typescript, VBScript, or any other programming language. The code may include embedded instructions, and/or machine-executable code instructions. The code may be embedded information such as hyperlinks, metadata, links, machine-executable instructions, annotations, etc. The code may be part of a resource (e.g., part of the HTML document) received from a resource server 110. The code may include one or more files, scripts or resources. For instance, code may be in the resource received from a resource server 110 as well as in a separate file referenced by the resource via a link. The code may indicate a landing page URL that specifies a web page or a resource to which an application (e.g. web browser) will be redirected. The code may be executed by the web browser when the display content 410 is displayed on the web browser. In some implementations, the code define the one or more layouts, cards, and assets. The code may include information about the third-party content provider, such as account information or a set of content items provided by the third-party content provider. The code may gather one or more client device identifiers or characteristics. The code, when executed on a client device 108, may select, arrange, modify, request, receive, and display the one or more layouts, cards, and assets. In some implementations, the code may allow the content item to be responsive to characteristics of a client device 108.

The third-party content server 106 can include a computing device configured to store content items, including one or more assets. The third-party content server 106 may be a computer server (e.g., a file transfer protocol (FTP) server, a file sharing server, a web server, a database server, etc.), a group or a combination of servers (e.g., a data center, a cloud computing platform, a server farm, etc.). The content server 106 may be any type of a computing device that includes a memory element configured to store content items and associated data. In some implementations, the third-party content server 106 may include any type of non-volatile memory, media, or memory devices. In some implementations, third-party content server 106 is local to content item management system 104, content item selection system 112, or resource server 110. In other implementations, third-party content server 106 may be remote data storage devices connected with content item management system 104 and/or content item selection system 112 via network 101. In some implementations, third-party content server 106 may be part of a data storage server or system capable of receiving and responding to queries from content item management system 104 and/or content item selection system 112. In some instances, the third-party content server 106 may be integrated into the content item management system 104 or the content item selection system 112.

The third-party content server 106 may receive content items from the third-party content provider 102 or from the content item management system 104. The third-party content server 106 may store a plurality of third-party content items that are from the third-party content provider 102. The third-party content server 106 may provide content items to the content item management system 104, client devices 108, resource servers 110, content item selection system 112, and/or to other computing devices via network 101. In some implementations, the client devices 108, resource servers 110, and content item selection system 112 may request content items stored in the third-party content server 106. The third-party content server 106 may store a content item with information identifying the third-party content provider, identifier of a set of content items, bid values, budgets, other information used by the content item selection system 112, impressions, clicks, and other performance metrics. The third-party content server 106 may further store one or more of client profile data, client device profile data, accounting data, or any other type of data used by content item management system 104 or the content item selection system 112.

The client device 108 may include any number and/or type of user-operable electronic device. For instance, a client device 108 may include a desktop computer, laptop, convertible PC, smart phone, wearable device, smart watch, tablet, phablet, personal digital assistant, set-top box, smart television, gaming console device, mobile communication device, remote workstation, client terminal, entertainment console, or any other device configured to communicate with other computing devices, systems, and servers via the network 101. The client device 108 may be capable of communicating with the resource server 110, the content item selection system 112, the third-party content server 106, and/or the resource servers 110. The client device 108 may store data to effect presentation of one or more resources, content items, etc. for presenting content, receiving input, or facilitating interaction with electronic content (e.g., clicking on a content item, hovering over a content item, etc.).

The client device 108 can execute an application (e.g., a web browser, a video game, a chat program, a mobile application, or other application) to request and retrieve resources and contents from the resource server 110 and/or other computing devices over network 101. Such an application may be configured to retrieve resources and first-party content from a resource server 110. The first-party content can include text, image, animation, video, and/or audio information. In some cases, an application running on the client device 108 may itself be first-party content (e.g., a game, a media player, etc.). The first-party content can contain third-party content or require the client device 108 to request a third-party content from a third-party content server 106. The client device 108 may display the retrieved third-party content by itself or with the resources or the first-party content on the user interface element. The client device 108 may include an application (e.g., a web browser, a resource renderer, etc.) for converting electronic content into a user-comprehensible format (e.g., visual, aural, graphical, etc.).

In some implementations, the application may be a web browser application, that may provide a browser window on a display of the client device 108. The web browser application may receive an input or a selection of a URL, such as a web address, from a user interface element or from a memory element. In response, one or more processors of the client device 108 executing the instructions from the web browser application may request data from the resource server 110 connected to the network 101 referred to by the URL address. The resource server 110 receiving the request may then provide web page data and/or other data to the client device 108, which causes visual indicia to be displayed by the user interface element of the client device 108. Accordingly, the browser window displays the retrieved first-party content, such as a web page from a website, to facilitate user interaction with the first-party content. The client device 108 and/or the agent may function as a user agent for allowing a user to view HTML encoded content.

The web browser on the client device 108 may also load third-party content along with the first-party content in the browser window. In some instances, the third-party content may be included within the first-party resource or content. In other instances, the first-party resource may include one or more content item slots. Each of the content item slots may contain embedded information (e.g. meta information embedded in hyperlinks, etc.) or instructions to request, retrieve, and load third-party content items. The content item slot may be a iframe slot, an in-page slot, and/or a JAVASCRIPT® slot. The web browser may process embedded information and execute embedded instructions. The web browser may present a retrieved third-party content item within a corresponding content item slot.

In some implementations, the client device 108 may execute an application, e.g. a program, that displays first-party resource or content that is stored in its memory or storage. In such implementations, the client device 108 may load or execute an application that itself is the first-party resource, that in some instances, may be downloaded from a resource server 110. Upon execution of the application, the client device 108 may request a content item from the content item selection system 112. For instance, the client device 108 may execute a mobile device that may execute a mobile app, which displays an interstitial content item.

In some implementations, the client device 108 may detect an input. The input may be detected from an input device or from a sensor. The input may be, for instance, changing the orientation of the screen. In some implementations, the input may be an interaction with a content item. An interaction with a content item may include displaying, hovering over, clicking on, viewing source information for the content item. The interaction may also be any other type of interaction between the client device 108 and a content item. Interaction with a content item does not require explicit action by a user of the client device 108 with respect to a particular content item. In some implementations, an impression (e.g., displaying or presenting the content item) may qualify as an interaction. In some implementations, an interaction require an engagement with the content item, e.g. clicking or selecting the content item, finish watching a video content item, completing a task, submitting a contact information, interacting with a social networking page, etc. The criteria for defining which user inputs or device outputs (e.g., active or passive) qualify as an interaction may be determined on an individual basis (e.g., for each content item) by content item selection system 112 or by content item management system 104.

The client device 108 may generate a variety of actions responsive to detecting an interaction with a content item. The generated action may include a plurality of attributes including a content identifier (e.g., a content ID or signature element), a device identifier, a referring URL identifier, a timestamp, or any other attributes describing the interaction. The client device 108 may generate actions when particular actions are performed by a device (e.g., resource views, online purchases, search queries submitted, etc.). The actions generated by the client device 108 may be communicated to a content item management system 104 or another accounting system. The client device 108 may also modify the content item responsive to detecting an interaction or request additional data referred to by the content item. The client device 108 is described in greater detail in relation to FIG. 4.

The resource server 110 can include a computing device, such as a database server, configured to store resources and content items. A computing device may be a computer server (e.g., a file transfer protocol (FTP) server, a file sharing server, a web server, a database server, etc.), a group or a combination of servers (e.g., a data center, a cloud computing platform, a server farm, etc.). The resource server 110 may be any type of a computing device that includes a memory element configured to store resources, content items, and associated data. The resource server 110 may include any type of non-volatile memory, media, or memory devices.

The resource server 110 may be configured to host resources. Resources may include any type of information or data structure that can be provided over network 101. Resources provided by the resource server 110 may be categorized as local resources, intranet resources, Internet resources, or other network resources. Resources may be identified by a resource address associated with the resource server 110 (e.g., a URL). Resources may include web pages (e.g., HTML web pages, PHP web pages, etc.), word processing documents, portable document format (PDF) documents, text documents, images, music, audio, video, graphics, programming elements, interactive content, streaming video/audio sources, comment threads, search results, information feeds, applications, or other types of electronic information. In some implementations, a first resource server 110 may host a publisher web page or a search engine and a second resource server 110 may host a landing page, which may be a web page indicated by a URL provided by the third-party content provider 102. In some implementations, a first resource server 110 may host an application, e.g. a mobile application, and a second resource server 110 may host a landing page. For instance, a client device 108 may download the application from the first resource server 110 and execute the application, which may cause the client device 108 to request a resource from the second resource server 110. Resources may include a content item slot, and when the client device 108 loads the resource, the content item slot may instruct the client device 108 to request a content item from a content item selection system 112.

The content item selection system 112 can include at least one logic device, such as a computing device having a data processor, to communicate via the network 101, for instance with a third-party content provider 102, the content item management system 104, the third-party content server 106, the client device 108, and the resource server 110. In some implementations, the content item selection system 112 may be combined with or include the third-party content server 106, the content item management system 112, or the resource server 110.

The content item selection system 112, in executing an online auction, can receive, via the network 101, a request for a content item. The received request may be sent from a resource server 110, a client device 108, or any other computing device in the system 100. The received request may include instructions for the content item selection system 112 to provide a content item with the resource. The received request can include device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the client device 108. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 112 to select third-party content items to be served with the requested resource and presented on a display of a client device 108. The selected content item may be marked as eligible to participate in an online auction.

In some implementations, the content item selection system 112 may receive a request from a client device 108 that may be loading or executing a web page or other resource (such as, for instance, an application) that includes one or more content item slots in which a selected and served third-party content item may be displayed. Code within the web page or other resource may be in JAVASCRIPT®, ECMASCRIPT®, HTML, etc, and define a content item slot. The code may include instructions to request a third-party content item from the content item selection system 112 to be presented with the resource. In some implementations, the code may include a content item request (e.g. an image request) comprising a URL that may include one or more parameters (e.g., /page/contentitem?devid=abc123&devnfo=A34r0). Such parameters may, in some implementations, be encoded strings such as "devid=abc123" and/or "devnfo=A34r0."

Content item selection system 112, in response to receiving the request, may select and serve third-party content items for presentation with requested resources via the Internet or other network. The content item selection system 112 may be controlled or otherwise influenced by a third-party content provider 102 that utilizes a content item management system 104. For instance, a third-party content provider 102 may specify selection criteria (such as keywords) and corresponding bid values that are used in the selection of the third-party content items. The bid values may be utilized by the content item selection system 112 in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider 102 may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system 112 uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some implementations, content item selection system 112 may determine one or more performance metrics for the third-party content items and the content item management system 104 may provide indications of such performance metrics to the third-party content provider 102 via a user interface. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content item selection, content item presentation, user click, or user engagement.

The content item selection system 112 may select a third-party content item to serve with the resource based on performance metrics and/or several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system 112 through an auction.

During the auction for a content item slot for a resource, content item selection system 112 may utilize several different types of bid values specified by third-party content provider 102 for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. To maximize the income generated, the content item selection system 112 may select the third-party content item with the highest value from the auction. In the foregoing instance, the content item selection system 112 may select the content item associated with the bid based on whether the user performs the specific action due to the higher value or score associated with that bid.

Once the content item selection system 112 selects a third-party content item, data to effect presentation of the third-party content item on a display of the client device 108 may be provided to the client device 108 using a network 101. The user on the client device 108 may select or click on the provided third-party content item. In some instances, a URL associated with the third-party content item may reference another resource, such as a web page or a landing page. In other instances, the URL may reference back to the content item selection system 112, a third-party content server 106, or a content item management system 104. The client device 108 may send a request using the URL, and one or more performance metrics are updated, such as a click-thru or engagement. The client device 108 is redirected to a resource, such as a web page or a landing page, that has been provided by a third-party content provider 102 along with the content item.

In some implementations, the content item selection system 112 can include a click server. The click server may measure, store, or update performance metrics. The click server may be part of the content item management system 104, or another server connected to the network 101. The click server receives a request from a client device 108 when the user interacts with the content item that the client device 108 receives from the content item selection system 112. For instance, a user on the client device 108 may interact with a content item by clicking the content item, and the user may be redirected to a click page stored on the click server. The click server may record an interaction with the content item. After recording the interaction, the click server may update a performance metric stored in the content item management system 104 or the third-party content server 106, where the performance metric is associated with a content item that was select to load on the client device 108. For instance, the metric may be a user engagement with an advertisement. The performance metric may be stored in association with the provided third-party content item in the third-party content server 106. The click server may redirect the client device 108 to a resource that is stored in a resource server 110, wherein the resource may be the landing page that is identified by the URL provided by the third-party content provider 102 and associated with the content item.

In an illustrative instance, a client device 108 using a web browser can browse to a web page provided by a web page publisher. The web page publisher may be the first-party content provider and the web page may be the first-party content. The web page can be provided by a resource server 110. The client device 108 loads the web page which includes a third-party content item, such as an ad. In some implementations, the resource server 110 may receive an ad from an ad server, e.g. content item selection system 112 and/or the third-party content server 106, and provide the ad with the web page to a device. 108 In some implementations, the web page publisher may provide search engine results and the ads may be provided with the search results. In some implementations, the web page may include a content item slot. The content item slot may include a link that either directly or indirectly references an ad server. For instance, as a web browser on a device loads the web page, the device requests the ad and receives it from the ad server. The ad server receives the ad from an advertiser, e.g. the third-party content provider 102, via the content item management system 104. The advertiser may create or provide information to generate the ad. The ad may link to a landing page which can be another web page or resource stored in a resource server 110. The link can be provided by the advertiser. In some implementations, the ad may link to a click server that updates performance metrics associated with the ad and redirects the client device 108 to the landing page.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content item from the content server that may be more relevant to the user. In some implementations, no personal information may be collected until a user opts-in to have his or her personal information collected. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Some personally identifiable information may be processed such that the processed information is not personally identifiable. For instance, location data may be processed so that only the amount of distance travelled may be collected. Thus, a user may have control over how information is collected (e.g., by an application, by client devices 108, etc.) and used by content item selection system 112.

Figure 2:
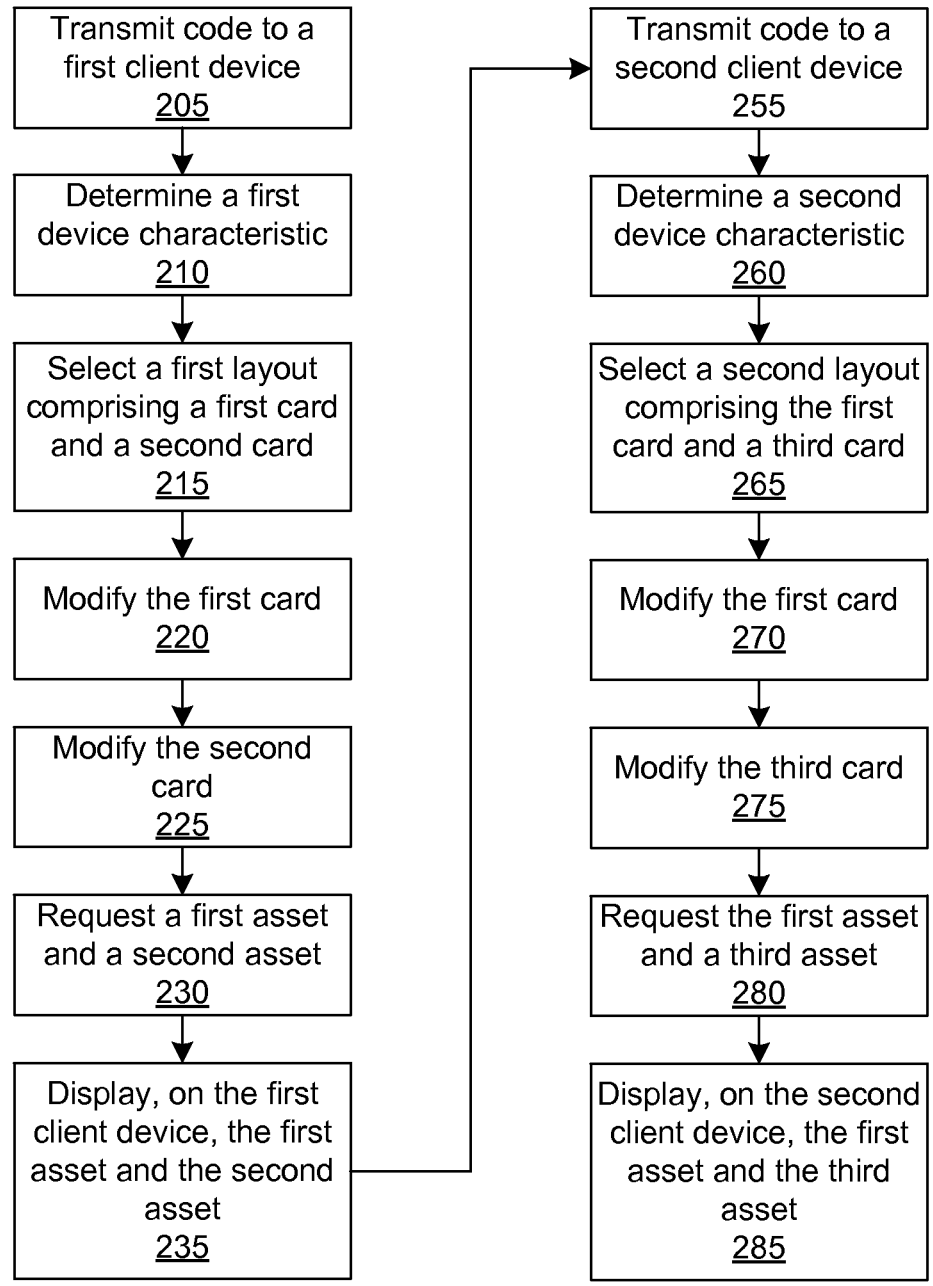
FIG. 2 is a flow diagram depicting a method for displaying one or more assets on client devices.

FIG. 2 is a flow diagram depicting a method 200 for displaying one or more assets on client devices. In brief overview, the method 200 generally includes transmitting code to a first client device (step 205). The code, when executed on the first client device, causes the first client device to determine a first device characteristic (step 210), select a first layout comprising a first card and a second card (step 215), modify the first card (step 220), and modify the second card (step 225). The code further causes the first client to request a first asset and a second asset (step 230), and display, on the first client device, the first asset and the second asset (step 235). The method further includes transmitting the code to a second client device (step 255). The code, when executed on the second client device, causes the second client device to determine a second device characteristic (step 260), select a second layout comprising the first card and a third card (step 265), modify the first card (step 270), and modify the third card (step 275). The code further causes the second client device to request the first asset and a third asset (step 280), and display, on the second client device, the first asset and the third asset (step 285).

Still referring to FIG. 2, and in more detail, the method includes transmitting code to a first client device (step 205). The first client device may be any type of client device 108 described in relation to FIGS. 1 and 4. The code may be transmitted from a third-party content server. The code may be transmitted in response to a request from the first client device for a content item or for a code referenced by the content item. In some implementations, the request may be made from the first client device after a client interacts with a content item in an invitation state, causing the content item to transition to an expanded state. The code may be included as part of a content item that is transmitted to the first client device. The code may be written in any language such as JAVASCRIPT®, ACTIONSCRIPT®, DART®, VBScript, Typescript, PYTHON®, HTML, or any other language. In some implementations, the code may be an executable file, application, or extension. The code may be executed by an application on the first client device. In some implementations, a web browser application may execute the code.

The code may cause the first client device to determine a first device characteristic (step 210). A device characteristic may include, for instance, screen size, screen orientation (e.g. landscape or portrait), screen shape, screen width, screen height, screen dimensions, screen dimensions ratio, screen pixel width, screen pixel height, screen pixel dimensions or resolution, screen resolution ratio, screen pixel density, device orientation, device acceleration, device location (e.g. geo-location, relative location to other devices, connection with other devices), amount of ambient light, amount of background noise, availability of specific types of input (e.g. touch display, mouse pointer, keyboard, microphone, speech, finger print scanner, biosensor, etc.), availability of specific types of output (e.g. haptic feedback, virtual reality headset, etc.), client device identifier, network characteristic (e.g. available bandwidth, type of network connection), connectivity capabilities of the client device (e.g. can make a phone call, can send an email, etc.), application type and version (e.g. type and version of web browser), application capabilities (e.g. supports HTML5 specification, allowing push notifications), user agent string, application configuration (e.g. web browser window size, viewport size, viewport width, viewport height, viewport ratio), account sign-in information, or content item configurations (e.g. container object size). In some implementations, a plurality of first device characteristics may be determined. For instance, the first client device may determine a screen size of the first client device and an availability of touch display input on the first client device. The first client device may determine the first device characteristic via an interface, a driver, or a library. In some implementations, the first device characteristic may be measured by a sensor of the first client device. For instance, the screen orientation may be measured by a gyroscope or an accelerometer. In some implementations, the first device characteristic may be a characteristic of a container object that includes the resource or the content item. The container object may be defined by the resource or the code. For instance, the container object may be a JAVASCRIPT® container that includes a characteristic (e.g. a property) that specifies its dimensions. In some implementations, the first device characteristic may be a characteristic of a web browser application. For instance, the first device characteristic may be a viewport width. In some implementations, the first client device may fail to determine a device characteristic, and determine another first device characteristic. For instance, the first client device may attempt to find the viewport size, determine that the viewport size is not set, and instead determine the screen size of the device. In some implementations, one or more characteristics may be gated by user permissions. For instance, precise geo-location, push notification, or account sign-in information may require a permission from a user or a device to be collected, determined, and/or accessed.

The code may cause the first client device to select a first layout comprising a first card and a second card (step 215). The first layout may be selected from a plurality of layouts. In some implementations, the layouts may be defined by code or by a resource (e.g. HTML, CSS, XML, JSON, JAVASCRIPT®, etc.) referenced by the code. The layouts may be selected based on the first device characteristic. In some implementations, one of a plurality of layouts may be a default layout. In some implementations, each of a plurality of layouts may be associated with a first device characteristic. For instance, a first layout may be associated with a screen width of less or equal to 480 pixels. A second layout may be associated with a screen width of greater than 480 pixels and less than or equal to 1024 pixels. A third layout may be associated with a screen width of greater than 1024 pixels and less than or equal to 1680 pixels. In some implementations, each layout of the plurality of layouts may be associated with a different type of device characteristic.

For instance, a first layout may be associated with an availability of a touch display input, and a second layout may be associated with an availability of a mouse input. In some implementations, a layout of the plurality of layouts may be associated with a plurality of first device characteristics. For instance, the first layout may be associated with the screen pixel width and the pixel density. In some instances, the first layout may be selected if it satisfies or matches each of the plurality of first device characteristics. In other instances, the first layout may be selected if it satisfies or matches at least one of the plurality of first device characteristics. In some implementations, a priority may be defined for each of the plurality of layouts, such that a layout with a higher priority will be selected over a layout with a lower priority. In some implementations, a layout may comprise a layout characteristic, which may be card arrangements, border width, border color, themes, color, font, font color, text, link, etc.

The first layout may comprise one or more cards. For instance, the first layout may comprise a first card and a second card. In other instances, the first layout may comprise a single card. In some implementations, different layouts may have different number of cards. For instance, a first layout may comprise one card and a second layout may comprise two cards. Each card may comprise one or more modifiable card characteristics. A card characteristic may be, for instance, position, theme, color, font, font color, text, link, interactive element, asset type, primary or secondary assignment, etc. In some implementations, a card characteristic may inherit from or refer to a layout characteristic. Two or more layouts may share a card. For instance, a first layout may comprise a first card, and a second layout may also comprise the first card. A card characteristic may be defined by a layout. For instance, the first layout may define a first card characteristic for the first card and a second card characteristic for the second card. In some implementations, a layout may define a plurality of card characteristic for each card. In some implementations, a layout may define a first card to be a primary card and a second card to be a secondary card.

Each card may correspond to one or more assets. For instance, a first card may correspond to a first asset and a second card may correspond to a second asset. In some implementations, a card may correspond to a plurality of assets. In some implementations, a card may correspond to a plurality of assets where each asset is a different type of an asset. An asset may be text, image, animation, video, multimedia, rich-media content, streaming audio/video source, map, link, FLASH® assets, applications, contact information, social feed, etc., or any combination.

The code may cause the first client device to modify the first card (step 220) and to modify the second card (step 225). The first card may be modified based on a first card characteristic (e.g. a characteristic of the first card) and the second card may be modified based on a second card characteristic (e.g. a characteristic of the second card). For instance, the first card characteristic may be location and/or size of the first card and the second card characteristic may be location and/or size of the second card. In another instance, the first card characteristic may be an assignment as a primary card, and the second card characteristic may be an assignment as a secondary card. In some implementations, a card may be modified to show more information based on the size of the card. For instance, based on the size of the first card, additional information may be displayed on the first card, such as a phone number or an address. In another instance, links, buttons, or other interactive elements may be added to the first card. Similarly, in some implementations, a card may be modified to show less information based on the size of the card. In some implementations, an element in a card may be added, subtracted, or modified. In some implementations, a card may be modified such that a different asset is assigned to it based on a card characteristic. For instance, a card may be associated with a video asset, but based on the size of the card, an image asset (e.g. a thumbnail image) may be assigned to the card instead. In some implementations, a card may be modified such that an asset associated with the card may be resized, reoriented, or repositioned. For instance, a card's dimension may define a square ratio. The asset, which may be a video in 16:9 ratio, may be resized so that the video fits in the card's dimensions. In some implementations, one or more cards may be modified based on a layout characteristic. For instance, a layout characteristic may comprise a card arrangements, border width, border color, themes, color, font, font color, text, link, etc. A card may include text which may be modified according to the theme. In some implementations, one or more cards may be modified based on a predefined setting. The predefined setting may be applied to a card invariant to device characteristics. For instance, a predefined setting may specify that a card must be at least 480 pixels wide, even on a client device with a smaller screen. In some implementations, the one or more cards may be modified based on one or more device characteristics. For instance, additional text may be added based on pixel density of the of the first device characteristic. In other instances, interactive elements may be added based on a device characteristic of the first client device (e.g. elements that can be swiped if touch display is available). The first client device may modify the first card based on a third device characteristic associated with the first client device.

The code may cause the first client device to request a first asset and a second asset (step 230). In some implementations, a client device may request one or more assets assigned to one or more cards of a selected layout. In some implementations, after modifying a first and second card, the first client device may only request an asset associated with one of the cards. For instance, the first client device may request only the first asset, which may be associated with the first card, which may be a primary card, and not request the second asset associated with the second card, which may be a secondary card. In some implementations, the first client device may request a plurality of assets associated with a first card and/or a plurality of assets associated with a second card. In some implementations, the first client device may request additional elements associated with the first card or the second card. In some implementations, the first client device may request one or more assets asynchronously, such that the content item and the resource loads and displays on the first client device independently. In some implementations, each asset is requested asynchronously, such that each asset loads and displays on the first client device independently. In some implementations, the first client device may request one or more assets from a third-party content server and/or a resource server. The first client device may receive one or more requested assets and modify the received assets.

The code may cause the first client device to display, on the first client device, the first asset and the second asset (step 235). The first client device may display the first asset based on the first card characteristic and display the second asset based on the second card characteristic. In some implementations, the first client device may format the one or more assets according to modifications to a corresponding card. For instance, the first asset may be resized to a smaller size to fit into a dimensions of the first card. In some implementations, the first client device may modify the asset by combining the asset with one or more other assets or elements, such as an image, link, button, or other interactive elements. For instance, the first client device may overlay an image of a play button to a video asset. In another instance, the first client device may add an element that launches an application (e.g. phone dialer) when a client interacts with the element. The first client device, after displaying the one or more assets, may wait for input, continue displaying the one or more assets (e.g. looping multimedia or video assets), or collapse (e.g. stop displaying, or to select a layout corresponding to an invitation state) the content item after a predetermined amount of time.

As shown in FIG. 2, the method further includes transmitting code to a second client device (step 255). This step may be similar to step 205 described above. The second client device may be any type of client device 108 described in relation to FIG. 1 and 4. The second client device may be different from the first client device in that it has at least one different device characteristic. In some implementations, code transmitted to the second client device may be the same code that is transmitted to the first client device. In some implementations, the second client device may be the same client device as the first client device at a later time, after one or more device characteristics have changed.

The code may cause the second client device to determine a second device characteristic (step 260). This step may be similar to step 210 described above. In some implementations, the second device characteristic may be a same type of characteristic as the first device characteristic. For instance, both the first and the second device characteristic may be the screen pixel width, and the screen pixel width of the first client device may be different from the screen pixel width of the second client device. In some implementations, the second device characteristic may be different types of characteristic. For instance, the first device characteristic may be a viewport size and the second device characteristic may be a screen size of the second client device.

The code may cause the second client device to select a second layout comprising the first card and a third card (step 265). This step may be similar to step 215 described above. The second card may comprise the first card and a third card. The first card may correspond to a first asset and the third card may correspond to a third asset. In some implementations, the first card of the second layout may be the same card as the first card of the first layout. In some implementations, a first card of the second layout may be a different card from the first card of the first layout, but the two first cards may correspond to a same asset or assets. In some implementations, the second layout may comprise a single card. For instance, the second layout may include a first card or a third card.

The code may cause the second client device to modify the first card (step 270) and to modify the third card (step 275). These steps may be similar to step 220 and step 225 described above. The second client device may modify the first card based on the first card characteristic. The first card characteristic may be the same first card characteristic used by the first client device to modify the first card or a different card characteristic. The first card characteristic may be associated with the first card or the second layout. The second client device may modify the third card based on a third card characteristic. The third card characteristic may be associated with the third card or the second layout. In some implementations, one or more cards may be modified based on a layout characteristic or a device characteristic. The second client device may modify one or more cards based on card characteristics, layout characteristics, second device characteristics, and/or predefined settings.

The code may cause the second client device to request the first asset and a third asset (step 280). This step may be similar to step 230 described above. In some implementations, the requests may be made asynchronously. In some implementations, the second client device may request one of the assets. In some implementations, the second client device may request the first asset and the third asset. Upon receiving the first and the third assets, the second client device may modify the first asset and/or the third asset.

The code may cause the second client device to display, on the second client device, the first asset and the third asset (step 285). This step may be similar to step 235 described above. The second client device may display the first asset based on the first card characteristic and display the third asset based on the third card characteristic. The second client device, after displaying one or more assets, may wait for input, continue displaying the one or more assets, and/or collapse the content item after a predetermined amount of time.

Figure 3:
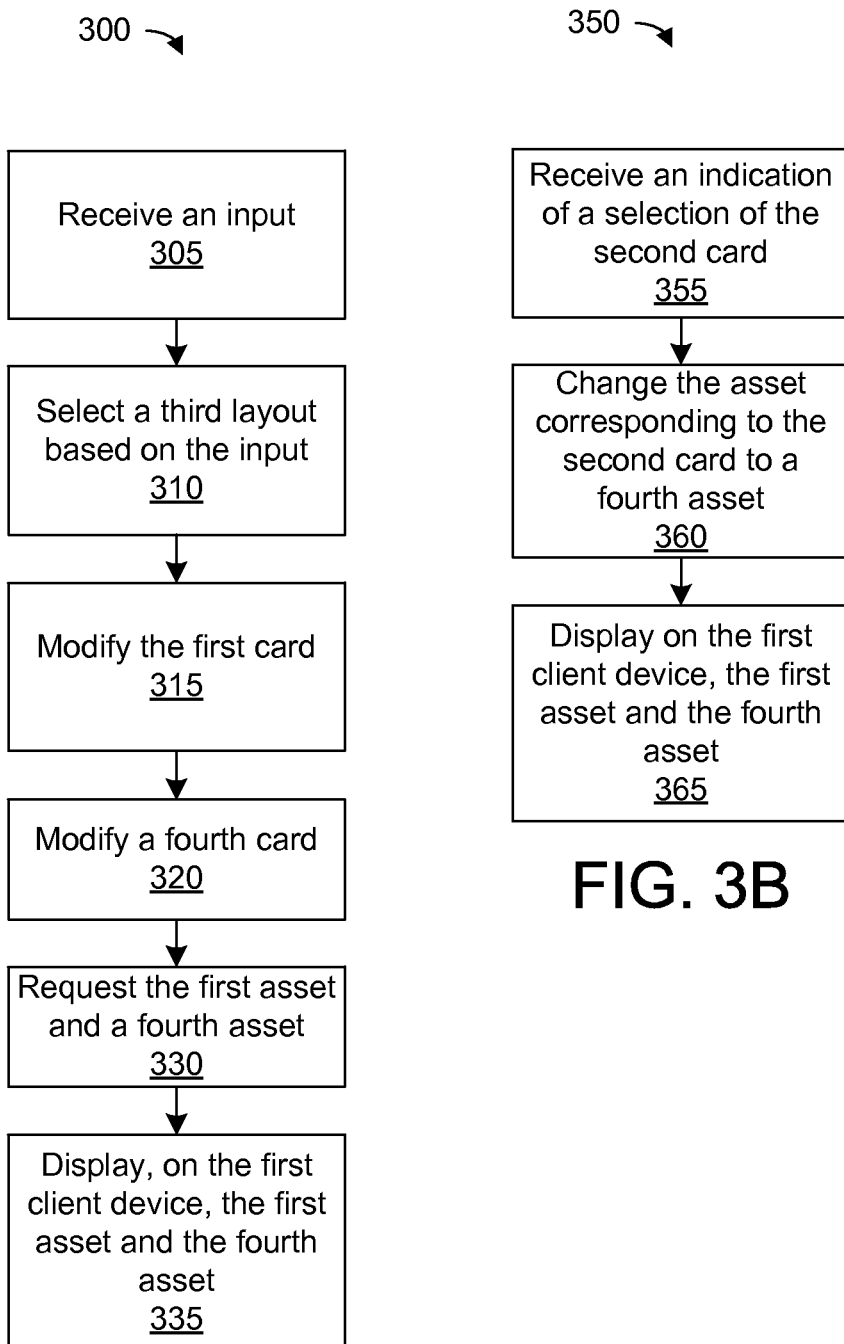
FIG. 3A is a flow diagram depicting a method for displaying one or more assets on a client device after receiving an input.
FIG. 3B is a flow diagram depicting a method for displaying one or more assets on a client device after receiving an indication of a selection.

FIG. 3A is a flow diagram depicting a method 300 for displaying one or more assets on a client device after receiving an input. In some implementation, this method 300 can be performed by a first client device or a second client device after the method 200 in FIG. 2 has been performed. In some implementations, the code that was transmitted in in FIG. 2 may cause the first client device or the second client device to perform this method 300. The method 300 includes the code, when executed on a client device (e.g. the first client device), causing the client device to receive an input (step 305), select a third layout based on the input (step 310), modify the first card (step 315), modify a fourth card (step 320), request the first asset and a fourth asset (step 330), and display on the first client device, the first asset and the fourth asset (step 335).

Still referring to FIG. 3A, and in more detail, the client device (e.g. the first client device) may receive an input (step 305). In some implementations, an application (e.g. a web browser) executing on the client device may be an indication of an input on the client device. An input may comprise one or more of: change in orientation of the client device, selection of a card (e.g. selection of the second card), interaction with an element in a card, switching to a different asset within a card, expanding from an invitation state, collapsing from an expanded state, playing or pausing a video asset, or interacting with the layout, card, or asset in any way.

As shown in FIG. 3A, the client device may select a third layout based on the input (step 310). In some implementations, the third layout is selected based on the input and one or more device characteristics. For instance, after a client device receives an indication of a change in orientation, the client device may determine a device characteristic, e.g. pixel width or screen dimensions. Based on the device characteristic, the client device may select a layout. The third layout may comprise different arrangement of the cards as compared to the first layout. The third layout may include a first card and a fourth card. The first card may correspond to the first asset and the fourth card may correspond to a fourth asset. In some implementations, the third layout may include different number of cards than the first layout. In some instances, the third layout may be an expanded state and the first layout may be an invitation state. In other instances, the first layout may be an expanded state and the third layout may be an invitation state. In some implementations, instead of selecting a third layout, the client device may modify the first layout. For instance, if the input is a change in orientation, each card in the first layout may be rotated and resized based on the orientation of the client device. In some implementations, the input may indicate that the first layout may be modified. For instance, a border between a first card and a second card may be repositioned, and/or each card may be resized and repositioned by the client device. Any modifications to a layout may only affect the layout on the client device making the modifications and not on any other client device.

As shown in FIG. 3A, the client device may modify the first card (step 315) and the fourth card (step 320). These steps may be similar to step 220 and step 225 described above in relation to FIG. 2. The first card may be based on the first card characteristic and the fourth card may be modified based on a fourth card characteristic. The first card characteristic and the fourth card characteristic may be defined by the third layout. In some implementations, the card characteristics may be based on a device characteristic and/or the input. In some implementations, one or more cards may change in position and/or assets. For instance, cards may switch positions or switch assets. In some implementations, the cards may be modified to show additional information or to launch an application. An input may indicate an interaction with an element in a card. For instance, the element may be expanded (e.g. resized) to show further information, such as a physical address of a business. In another instance, the element may launch an application such as a phone dialing application on a mobile phone device. In some implementations, a card may select an asset out of a plurality assets associated with the card. In some implementations, an asset corresponding to a card may be modified. For instance, an asset may be a video asset, and the interaction may play or pause the video asset. In some implementations, modifying one or more cards may include modifying a layout based on a predefined setting such as a predefined theme.

As shown in FIG. 3A, the client device may request the first asset and the fourth asset (step 330). This step may be similar to step 230 described above in relation to FIG. 2. In some implementations, the requests may be made asynchronously. In some implementations, the first client device may request one of the assets. In some implementations, the first client device may request the first asset and the fourth asset. Upon receiving the first and the fourth assets, the first client device may modify the first asset and/or the fourth asset. In some implementations, the client device may transmit an indication of a client interaction or input, which may be stored or used as a performance metric associated with the content item based on the type of input. For instance, if the input is a change in device indication, the client device may not transmit the input.

As shown in FIG. 3A, the client device may display on the first client device, the first asset and the fourth asset (step 335). This step may be similar to step 235 described above in relation to FIG. 2. The first client device may display the first asset may be based on the first card characteristic and the fourth asset based on the fourth card characteristic. In some implementations, after displaying one or more assets, the first client device may wait for input, continue displaying the one or more assets, and/or collapse the content item after a predetermined amount of time. In some implementations, the client device may display a transition animation over a period of time while switching between the second asset and the fourth asset for the second card.

FIG. 3B is a flow diagram depicting a method 350 for displaying one or more assets on a client device after receiving an indication of a selection. In some implementations, the method 350 may be one instance of a method 300 for displaying one or more assets on a client device after receiving an input. Similar to the method 300 in FIG. 3A, the method can be performed by a first client device or a second client device after the method 200 in FIG. 2 has been performed. In some implementations, the code that was transmitted in in FIG. 2 may cause the first client device or the second client device to perform this method 350. The method 350 includes the code, when executed on a client device (e.g. the first client device), causing the client device to receive an indication of a selection of the second card (step 355), change the asset corresponding to the second card to a fourth asset (step 360), and display on the first client device, the first asset and the fourth asset (step 365).

Still referring to FIG. 3B, and in more detail, the client device (e.g. the first client device) may receive an indication of a selection of the second card (step 355). The client device may receive an indication from a client. For instance, the client may have selected via clicking, tapping, or otherwise selecting a second card.

As shown in FIG. 3B, the client device may further change the asset corresponding to the second card to a fourth asset (step 360). The client device may change an asset associated with the selected card. In some implementations, the client device may have already requested and received the fourth asset and have stored it in memory and thus, no request for the fourth asset may be necessary. In other implementations, the client device may request the fourth asset.

As shown in FIG. 3B, the client device may further display on the first client device, the first asset and the fourth asset (step 365). This step may be similar to step 235 described above in relation to FIG. 2. In some implementations, the client device may display a transition animation over a period of time while switching between the second asset and the fourth asset for the second card.

Figure 4:
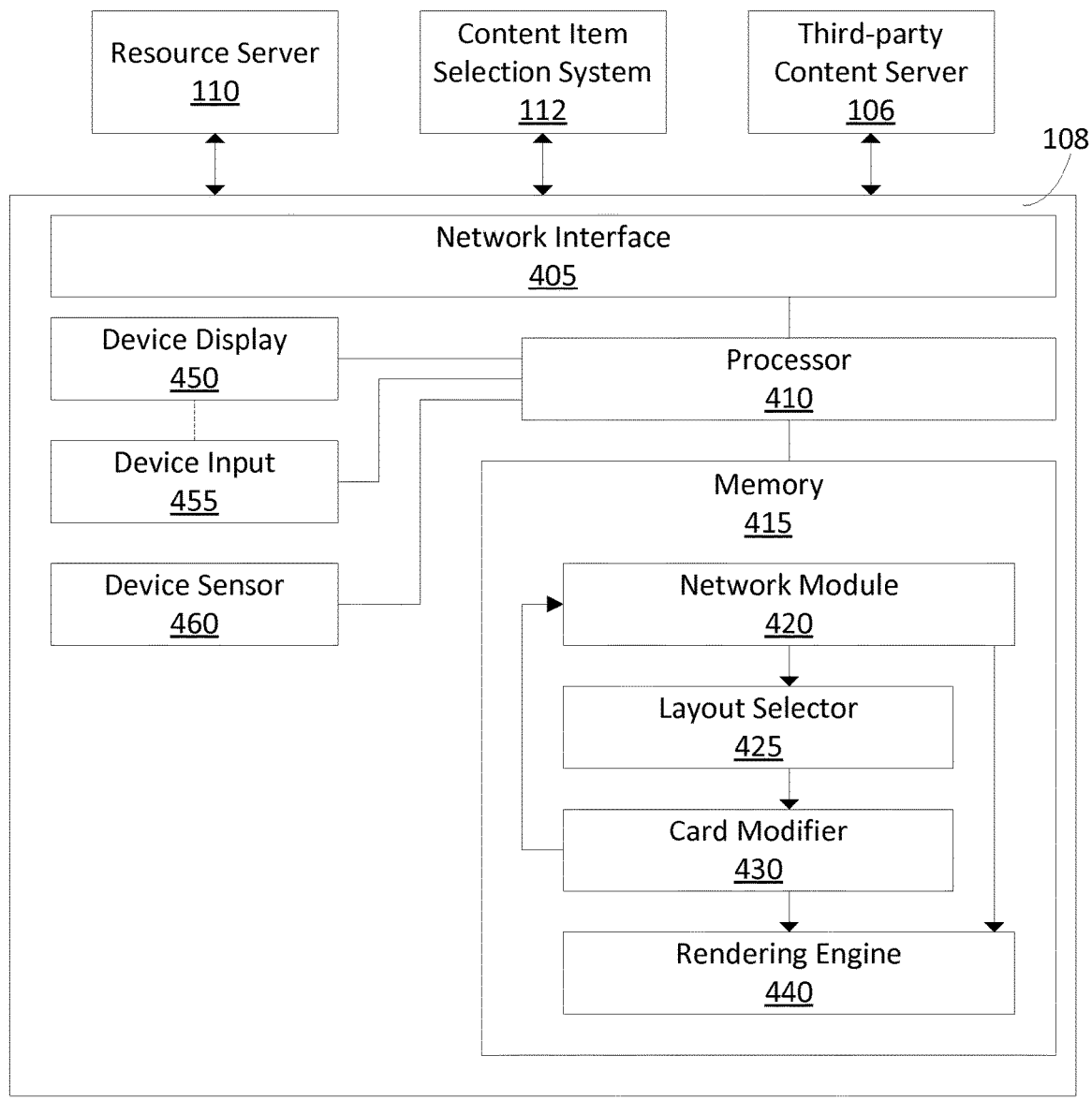
FIG. 4 is a block diagram illustrating an implementation of the client device of FIG. 1 in greater detail.

FIG. 4 is a block diagram illustrating an implementation of the client device 108 of FIG. 1 in greater detail, shown to include a network interface 405, processor 410, memory 415, device display 450, device input 455, and device sensor 460. The client device 108 may be a computing device. The computing device, including network interface, processor, and memory are described in relation to FIG. 1. In further detail, the network interface 405 may allow the client device 108 to communicate with the third-party content server 106, resource server 110, content item selection 112, and other components of computer system 100. In some implementations, the network interface 405 may receive a resource server 110 and content item from third-party content server 106 or the content item selection system 112. For instance, the network interface 405 may receive code included with a content item transmitted from a computing device. The network interface 405 may transmit the received resource and content item to the processor 410, memory 415, and/or any module or application in memory.

The processor 410 may execute an application in memory 415 to receive the resource and content item from the network interface 405. The processor 410 may display the resource and the content item on the device display 450. In some implementations, the processor 410 may write to memory 415, a cache, or a buffer to change the visual indicia on the device display 450. The processor 410 may receive input from the device input 455 and the device sensor 460. In some implementations, the processor 410 may receive an interrupt, a signal, a notification from the device input 455 or the device sensor 460. In some implementations, the processor 410 may read from memory 415, a cache, or a buffer that includes an input value or a sensor value from the device input 455 or the device sensor 460.

Memory 415 may include one or more devices for storing data and/or computer code for completing and/or facilitating the various processes, applications, and modules described in the present disclosure. Memory 415 may include database components, object code components, script components, or any other type of information structure for supporting the various activities and information structures described in the present disclosure. In some implementations, memory 415 is communicably connected to processor 410 and includes computer code (e.g., data modules stored in memory 415). In some implementations, the network interface 405, the processor 410, the device display 450, device input 455, and/or the device sensor 460 may write to or read from memory 415. In brief overview, memory 415 is shown to include a network module 420, layout selector 425, card modifier 430, and rendering engine 440. One or more of the modules, components, layers, or engines made be part of an operating system, kernel, library, application framework, or application (e.g. a web browser or a mobile application) stored in memory 415.

Still referring to FIG. 4, memory 415 is shown to include a network module 420. The network module 420 may include or communicate with a software component of the network interface 405. In some implementations, the network module 420 may include or communicate with an application (e.g. a web browser) in memory 415. In some implementations, the network module 420 may be part of the application. The network module 420 may request and receive one or more resources, content items, layouts, cards, or assets via the network interface 405. A content item may include code. The content item may include one or more layouts. In some implementations, the code of the content item includes or defines the one or more layouts. Upon receiving the code, the network module 415 may store the received code in memory 415. The network module 415 may inform an application (e.g. a web browser), a component, or a module. In some implementations, the network module 420 may request or be used by an application to request one or more assets. The request for one or more assets may be sent to a third-party content server 106. The request may be made after a card modifier 430 processes or modifies one or more cards associated with a layout. In some implementations, additional request made be made after an input is received by the client device 108 and the one or more cards are modified based on a new layout selected based on the input.

As shown in FIG. 4, the memory 415 is shown to include a layout selector 425. The layout selector 425 may be part of an application (e.g. a web browser). For instance, the layout selector 425 may be a module, a layer, a component of an application. The layout selector 425 may communicate with the network module 420, card modifier 430, application on memory 415, device display 450, device input 455, or device sensor 460. The layout selector 425 may determine one or more layouts of a content item, determine a device characteristic of the client device 108, select a layout based on the device characteristic, and receive input.

The layout selector 425 may determine one or more layouts of a content item. The layout selector 425 may parse and/or execute the received code. The code may be associated with or part of a content item. In some implementations, the layout selector 425 may parse the code or the content item to determine or retrieve one or more layouts. In some implementations, the one or more layouts may be linked from the code. In some implementations, the layout selector 425 may receive one or more layouts from the application. In some implementations, the layout selector 425 may determine, for each layout, an associated device characteristic. In some implementations, the layout selector 425 may determine, from a plurality of layouts, a default layout.

The layout selector 425 may determine a device characteristic of the client device 108. The layout selector 425 may communicate with an operating system, kernel, library, library framework, or application to determine a device characteristic. In some implementations, the layout selector 425 may determine the device characteristic from the portion of code or content item. In some implementations, the layout selector 425 may determine a device characteristic from the device display 450, device input 455, device sensor 460, network interface 405, or an application on memory 415 (e.g. web browser viewport). In some implementations, the layout selector 425 may determine a plurality of device characteristics. In some implementations, the layout selector 425 may fail to determine a device characteristic. In some implementations, the layout selector 425 may determine another device characteristic responsive to failing to determine a device characteristic.

The layout selector 425 may select a layout based on the one or more device characteristics. In some implementations, the layout selector 425 may select a layout based on the determined device characteristic that matches the corresponding device characteristics of the one or more layouts. In some implementations, the layout selector 425 may select a default layout. The layout selector 425 may communicate the selected layout to memory 415 or an application 415 in memory 415. In some implementations, the layout selector 425 may communicate the selected layout to the card modifier 430.

In some implementations, the layout selector 425 may receive an input. In some implementations, the input may be transmitted to update a performance metric associated with a content item, based on the type of input. For instance, if the input is a change in orientation of the client device 108, the input may not be transmitted. The layout selector 425 may receive the input from the device input 455 or from the device sensor 460. In some implementation, an application in memory 415 may receive or detect an input and call the layout selector 425. In some implementations, the layout selector 425 may select a layout based on the input. For instance, the layout selector 425 may select a layout based on the orientation of the client device 108. In some implementations, the layout selector 425 may select a different layout compared to a layout selected before the input. For instance, the layout selector 425 may select a third layout for the first client device 108, after selecting a first layout for the first client device 108 before the input. The layout selector 425 may select a layout from a plurality of layouts based on the input and one or more additional device characteristics.

As shown in FIG. 4, the memory 415 is shown to include a card modifier 430. In some implementations, the card modifier 430 may be defined by the code of the content item. In some implementations, the card modifier 430 may modify a card based on an associated card characteristic. In some implementations, a card and a card characteristic may be defined by the selected layout. In some implementations, the card modifier 430 may modify a first card based on a first card characteristic and modify a second card based on a second card characteristic. In some implementations, the card modifier 430 may modify a card based on the device characteristic. In some implementations, a layout modifier may call the card modifier 430. In some implementations, the card modifier 430 may apply a theme to a card. In some implementations, the card modifier 430 may select an asset out of a plurality of assets associated with a card. In some implementations, the card modifier 430 may resize, reorient, or reposition a card. In some implementations, the card modifier 430 may add, subtract, or modify elements or information to a card. In some implementations, the card modifier 430 may add an interactive element to a card. In some implementations, the card modifier 430 may adjust an asset associated with the card. In some implementations, the card modifier 430 may modify a card based on a device characteristic. In some implementations, the card modifier 430 may determine one or more assets of the one or more modified cards. The application may request the one or more assets via the network module 420 and the network interface 405. Upon receiving the one or more assets, the card modifier 430 may further modify or process the assets. In some implementations, after the layout selector 425 selects another layout (e.g. a third layout) after receiving an input, the card modifier 430 may modify one or more cards associated with the selected layout. For instance, if a third layout comprises a first card and a fourth card, the card modifier 430 may modify the first card and the fourth card based on corresponding card characteristics. The card modifier 430 may further communicate with the network module 420 or an application to request the assets associated with the modified cards.

As shown in FIG. 4, the memory 415 is shown to include a rendering engine 440. The rendering engine 440 may display, on the device display 450, the one or more assets. Each asset may be displayed based on a card and a card characteristic corresponding to the asset. The rendering engine 440 may process one or more assets prior to displaying in the device display 450. The rendering engine 440 or the application may further wait for input from the device input 455, continue displaying one or more assets, or collapse the content item within a resource after a predetermined amount of time. In some implementations, the rendering engine 440 may redisplay a resource, content item and one or more assets after receiving an input.

As shown in FIG. 4, the client device 108 is shown to include a device display 450. The device display 450 may include a CRT (cathode ray tube), LCD (liquid crystal display), LED (light-emitting diode), OLED (organic light emitting diode), TFT (thin-film transistor), projector, or any other monitor or display capable of displaying a resource, content item, and assets. The device display 450 may be a touchscreen display and/or may be connected to a device input 455. The device display 450 may specify or be associated with one or more characteristics (e.g. device characteristics). For instance, the device display 450 may provide screen size, dimensions, ratio, etc. The device display 450 may also provide pixel size, dimensions, ratio, density, etc. A characteristic of the device display 450 may be stored in memory 415 and/or may be accessed by a call to an application programming interface (API) that may be part of an operating system, kernel, library, application framework, or application stored in memory 415. The device display 450 may read data to display from memory 415, cache, or buffer.

As shown in FIG. 4, the client device 108 is shown to include a device input 455. The device input 455 may receive input from a client using the client device 108. The device input 455 may transmit, notify, signal, or interrupt the processor 410, a process, or an application. The device input 455 may write to memory 415 or send an input value to processor 410. The device input 455 may be one of a touchscreen input, keyboard, mouse, or any other input. The device input 455 may provide an indication of a selection a card or an asset. The device input 455 may provide an indication of an interaction with a content item, e.g. with a card or an asset. The device input 455 may detect one or more of: selection of a card (e.g. selection of the second card), interaction with an element in a card, switching to a different asset within a card, expanding from an invitation state, collapsing from an expanded state, playing or pausing a video asset, or interacting with the layout, card, or asset in any way.

As shown in FIG. 4, the client device 108 is shown to include a device sensor 460. The device sensor 460 may detect or sense one or more characteristic of the client device 108. The device sensor 460 may be one or more of a gyroscope, accelerometer, microphone, ambient light sensor, biosensor, or any other sensor or instrument capable of measuring a state of the client device 108 or its environment. The device sensor 460 may write to the memory 415. In some implementations, the device sensor 460 may transmit, notify, signal, or interrupt the processor 410, a process, or an application. For instance, the device sensor 460 may detect when the client device 108 is in a different orientation (e.g. landscape vs. portrait) and send an update to an operating system in memory 415. The device sensor 460 may write to memory 415. The device sensor 460 may be called via an API that may be part of an operating system, kernel, library, application framework, or application stored in memory 415.

Figure 5A:
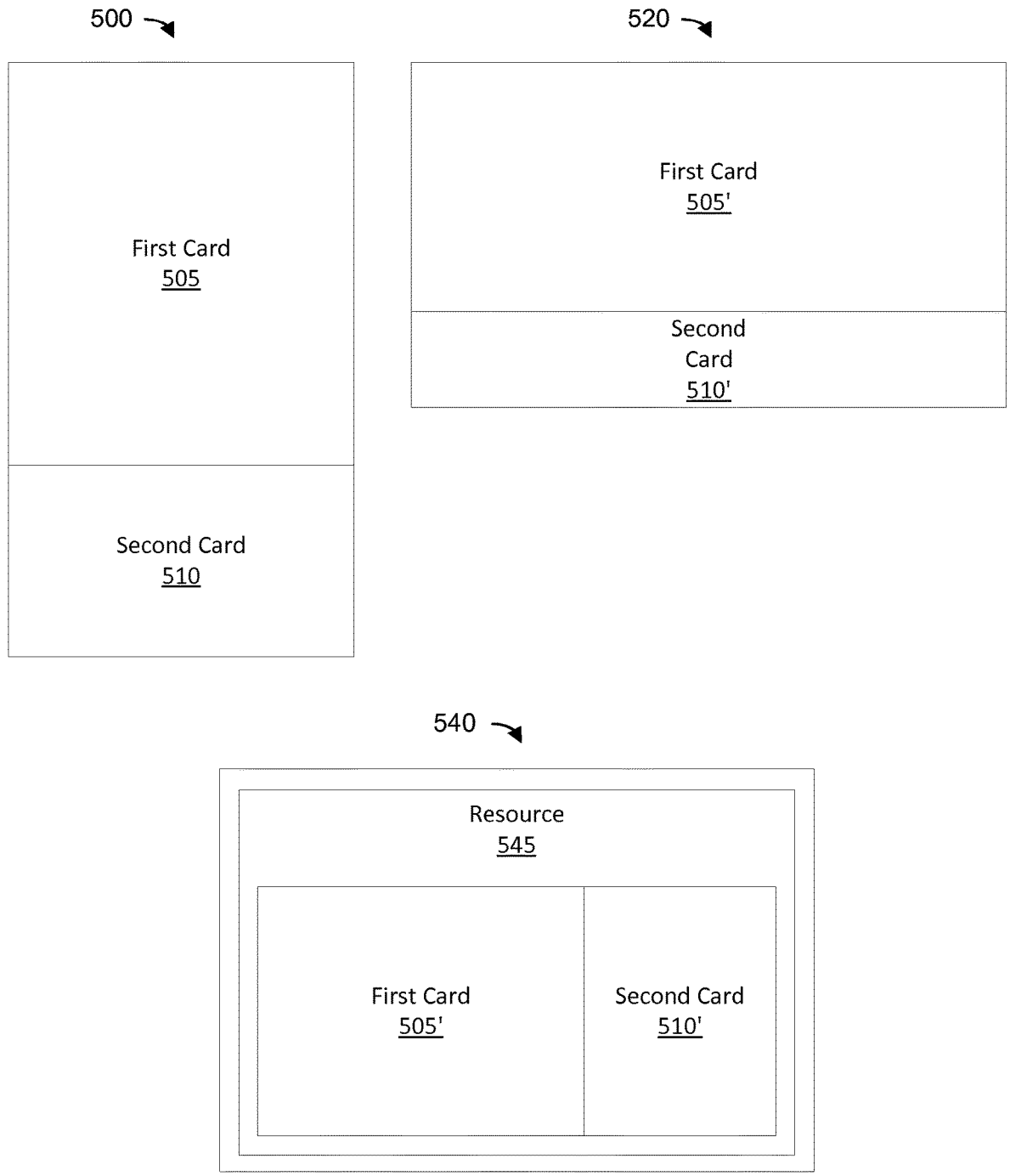
FIG. 5A is an illustrative content item displayed on different screens.

FIG. 5A is an illustrative content item displayed on different screens. The first screen 500 may be a screen of a mobile phone or a tablet on a portrait orientation. The second screen 520 may be a screen of a mobile phone or a tablet on a landscape orientation. The third screen 540 may be a screen of a laptop or a desktop. All three screens are illustrated to display a content item, but for each screen, a different layout may be selected. A first layout may be selected for the first screen 500 based on the size and orientation of the screen or client device. A second layout may be selected for the second screen 520 based on the size and/or orientation of the screen or client device. The second layout may be selected also based on type of input available for the client device, e.g. the second layout may be selected based on availability of touch-screen input. A third layout may be selected for the third screen 540 based on the size of the screen, or the type of client device.

The first layout may include a first card 505 and a second card 510. In some implementations, the first card 505 may be a primary card and the second card may be a secondary card 510. In some implementations, the first layout may include a first card 505 and the second card 510 may be a thumbnail image. Selecting the second card 510 may change the first card 505, an asset associated with the first card 505, the second card 510, and/or an asset associated with the second card 510.

The second layout may also include a first card 505' and a second card 510', but the position, size, orientation, arrangement, etc. may be defined differently in the second layout compared to the first layout for the first screen 500. In some implementations, the second layout may include one or more cards not in the first layout. For instance, the second layout may include a first card 505' and a third card instead of the second card 510'. In some implementations, the second layout for the second screen 520 may have a greater number of cards than the first layout for the first screen 500.

The third layout may arrange cards differently compared to both the first layout and the second layout. The third layout may be an expanded state. At a corresponding invitation state, the content item may be displayed within a resource 545, e.g. as a banner content item. The resource 545 may be first-party content such as a publisher web page. When a client clicks or interacts with the the content item at the invitation state, an expanded state may be displayed. The expanded state may comprise the third layout. The third layout may be displayed with the resource 545 or displayed on top of the resource 545. In some implementations, the third layout may be an invitation state.

Figure 5B:
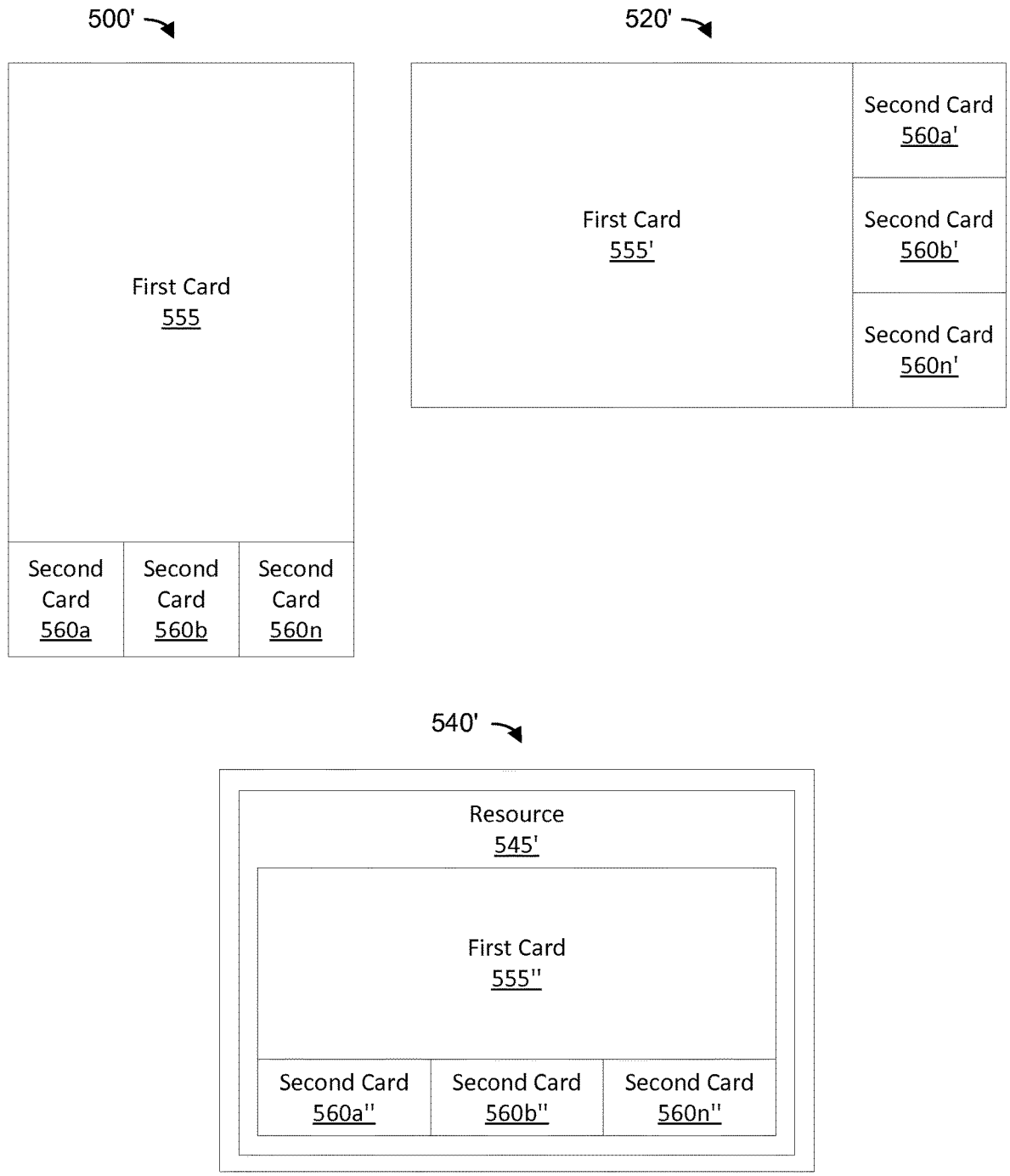
FIG. 5B is another illustrative content item displayed on different screens.

FIG. 5B is another illustrative content item displayed on different screens. The first screen 500', second screen 520', and the third screen 540' may be similar to the three screens described in relation to FIG. 5A. A layout may be selected from a plurality of layouts associated with a content item, based on one or more device characteristics.

The first layout of the first screen may comprise a first card 555' and a plurality of second cards 560a-560n (generally "second cards 560"). In some implementations, the first layout may comprise a primary card, a secondary card, and a tertiary card. In some implementations, a client may select on one of the second cards 560, and the selected card may switch positions with the primary card. In some implementations, the selected secondary card would switch assets with the primary card. In some implementations, the primary card would mirror the asset of one of the second cards 560. In some implementations, each of the plurality of second cards 560 may be thumbnails and may be associated with a unique asset or a unique card. Selection of one of the plurality of second cards may switch the first card 555', or the asset associated with the first card 555'.

The second layout for the second screen 520' may arrange the cards differently based on the available screen size, pixels, or any other device characteristic. In some implementations, the second layout may have different set of cards, e.g. different types of first card 555' or second cards 560', compared to the first layout. In some implementations, the second layout may have a higher number of cards than the first layout.

The third layout for the third screen 540' may arrange cards differently compared to both the first and the second layout. The third layout may include a different arrangement of the first card 555" and the plurality of second cards 560". The third layout may display the cards with a resource 545', e.g. on top of the resource 545'. The third layout may display a greater number of cards than the first layout or the second layout. In some implementations, the third layout may be an invitation state or an expanded state.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client"0 or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A computer-implemented method of providing responsive content, comprising:
   transmitting, by a content server to a client device, a content item package data structure comprising (i) a plurality of layouts establishing a size and a position for at least one card based on a device characteristic, the at least one card specifying a type and a format for an asset provided by a provider, and (ii) instructions to modify the at least one card based on a change in the device characteristic, the instructions, which when processed by the client device, cause the client device to:
      detect, responsive to input from an application executing on the client device, the change in the device characteristic;
      modify, based on the change detected in the device characteristic, a first card of the at least one card using a first layout selected from the plurality of layouts of the content item package data structure, the first layout configured to establish a first size and a first position for the first card; and
      request content for the modified first card having the first size and the first position;
   receiving, by the content server from the client device processing the content item package data structure, the request for content for the modified first card having the first size and the first position;
   selecting, by the content server responsive to receiving the request for content for the modified first card, a first asset corresponding to the modified first card having the first size and the first position; and
   transmitting, by the content server to the client device, responsive to selecting the first asset, the selected first asset for rendering by the client device in the modified first card having the first size and the first position.

2. The computer-implemented method of claim 1, further comprising:
   receiving, by the content server, a second request for content responsive to detection of a second change to the device characteristic, the second request indicating a second layout selected from the plurality of layouts having a second card with a second size and a second position;

selecting, by the content server, based on the second layout having the second card with the second size and the second position, a second asset responsive to the second request; and transmitting, by the content server to the client device, the selected second asset for rendering by the client device in the second card with the second layout.

3. The computer-implemented method of claim 1, further comprising:

providing, by the content server to a second client device, the content item package data structure;

receiving, by the content server, responsive to the second client device processing the content item package data structure, a request for content for the modified first card corresponding to the first layout, the first size, and the first position;

selecting, by the content server, a second asset for the modified first card responsive to the request from the second client device; and transmitting, by the content server to the second client device, the selected second asset for rendering by the second client device in the modified first card having the first size and the first position.

4. The computer-implemented method of claim 3, further comprising:

receiving, by the content server from the second client device, a third request for content, the third request generated by the second client device responsive to detection of a change in the device characteristic of the second client device, the change in the device characteristic causing selection of a second layout from the plurality of layouts, the second layout comprising a second card with a second size and second position;

selecting, by the content server, a third asset for the second card responsive to the third request from the second client device; and transmitting, by the content server to the second client device, the selected third asset for rendering by the second client device in the second card with the second layout.

5. The computer-implemented method of claim 1, wherein the device characteristic comprises one of screen size, screen orientation, screen shape, screen width, screen height, screen dimensions, screen dimensions ratio, screen pixel width, screen pixel height, screen pixel dimensions or resolution, screen resolution ratio, screen pixel density, screen orientation, device orientation, device acceleration, device location, amount of ambient light, amount of background noise, availability of specific types of input, availability of specific types of output, client device identifier, network characteristic, connectivity capabilities of the client device, application type and version, application capabilities, user agent string, application configuration, or content item configurations.

6. The computer-implemented method of claim 1, wherein the first layout is a multi-video ad template, catalog template, magazine template, mixed content template, primary-secondary template, a primary-secondary-tertiary template, a thumbnail template, a map template, or a product template.

7. The computer-implemented method of claim 1, wherein each of the at least one card comprises at least one of:

text, image, animation, video, multimedia, rich-media content, streaming audio/video source, map, link, applications, contact information, or social feed.

8. The computer-implemented method of claim 1, further comprising:

receiving, by the content server from the client device, an indication of a change in a device orientation of the device, the change in the device orientation causing selection, by the client device processing the content item package data structure to execute the instructions to modify the at least one card, of a second layout from the plurality of layouts, the second layout having the modified first card and a second card;

receiving, by the content server, a request for content for the second card;

selecting, by the content server, a second asset for the second card; and transmitting, by the content server to the client device, the selected second asset to cause the client device to redisplay, on the client device, the first asset for the modified first card and render the selected second asset for the second card with the second layout.

9. The computer-implemented method of claim 1, further comprising:

receiving, by the content server, an indication of a selection of the modified first card; and providing, by the content server, an instruction to change the first asset corresponding to the modified first card to a second asset, the instruction causing the client device to redisplay the modified first card having the first size and the first position with the second asset.

10. The computer-implemented method of claim 1, further comprising:

transmitting, by the content server to the client device, the content item package data structure comprising code configured for processing by the client device, which when processed by the client device, causes the client device to at least one of:

modify the first card based on a first layout characteristic associated with the first layout;

modify the first card based on a predefined setting, comprising one of size, dimensions, theme, color, accent color, background image, or opacity; or modify the first layout based on a predefined theme.

11. A system for providing responsive content, comprising:

a content server comprising one or more processors and memory, the content server configured to:

transmit, to a client device, a content item package data structure comprising (i) a plurality of layouts establishing a size and a position for at least one card based on a device characteristic, the at least one card specifying a type and a format for an asset provided by a provider, and (ii) instructions to modify the at least one card based on a change in the device characteristic, the instructions, which when processed by the client device, cause the client device to:

detect, responsive to input from an application executing on the client device, the change in the device characteristic;

modify, based on the change detected in the device characteristic, a first card of the at least one card using a first layout selected from the plurality of layouts of the content item package data structure, the first layout configured to establish a first size and a first position for the first card; and request a content item for the modified first card having the first size and the first position;

receive, from the client device processing the content item package data structure, the request for content for the modified first card, the request for content for the modified first card having the first size and the first position;

select, responsive to the request for content for the modified first card, a first asset corresponding to the modified first card having the first size and the first position; and transmit, to the client device, responsive to selection of the first asset, the selected first asset for rendering by the client device in the modified first card having the first size and the first position.

12. The system of claim 11, wherein the content server is further configured to:

receive, subsequent to the client device processing the content item package data structure, a second request for content responsive to detection of a second change to the device characteristic, the second request indicating a second layout selected from the plurality of layouts having a second card with a second size and a second position;

select, based on the second layout having the second card with the second size and the second position, a second asset responsive to the second request; and transmit, to the client device, the selected second asset for rendering by the client device in the second card with the second layout.

13. The system of claim 11, wherein the content server is further configured to:

provide, to a second client device, the content item package data structure;

receive, responsive to the second client device processing the content item package data structure, a request for content for the modified first card corresponding to the first layout, the first size, and the first position;

select a second asset for the modified first card responsive to the request from the second client device; and transmit, to the second client device, the selected second asset for rendering by the second client device in the modified first card having the first size and the first position.

14. The system of claim 13, wherein the content server is further configured to:

receive, from the second client device, a third request for content, the third request generated by the second client device responsive to detection of a change in the device characteristic of the second client device, the change in the device characteristic causing selection of a second layout from the plurality of layouts, the second layout comprising a second card with a second size and second position;

select a third asset for the second card responsive to the third request from the second client device; and transmit, to the second client device, the selected third asset for rendering by the second client device in the second card with the second layout.

15. The system of claim 11, wherein the device characteristic comprises one of screen size, screen orientation, screen shape, screen width, screen height, screen dimensions, screen dimensions ratio, screen pixel width, screen pixel height, screen pixel dimensions or resolution, screen resolution ratio, screen pixel density, screen orientation, device orientation, device acceleration, device location, amount of ambient light, amount of background noise, availability of specific types of input, availability of specific types of output, client device identifier, network characteristic, connectivity capabilities of the client device, application type and version, application capabilities, user agent string, application configuration, or content item configurations.

16. The system of claim 11, wherein the first layout is a multi-video ad template, catalog template, magazine template, mixed content template, primary-secondary template, a primary-secondary-tertiary template, a thumbnail template, a map template, or a product template.

17. The system of claim 11, wherein each of the at least one card comprises at least one of:

text, image, animation, video, multimedia, rich-media content, streaming audio/video source, map, link, applications, contact information, or social feed.

18. The system of claim 11, wherein the content server is further configured to:

receive, from the client device, an indication of a change in a device orientation of the device, the change in the device orientation causing selection, by the client device processing the content item package data structure to execute the instructions to modify the at least one card, of a second layout from the plurality of layouts, the second layout having the modified first card and a second card;

receive, a request for content for the second card;

select a second asset for the second card; and transmit, to the client device, the selected second asset to cause the client device to redisplay, on the client device, the first asset for the modified first card and render the selected second asset for the second card with the second layout.

19. The system of claim 11, wherein the content server is further configured to:

receive an indication of a selection of the first card; and provide an instruction to change the first asset corresponding to the modified first card to a second asset, the instruction causing the client device to redisplay the modified first card having the first size and the first position with the second asset.

20. The system of claim 11, wherein the content server is further configured to:

transmit, to the client device, the content item package data structure comprising code configured for processing by the client device, which when processed by the client device, causes the client device to at least one of:

modify the first card based on a first layout characteristic associated with the first layout;

modify the first card based on a predefined setting, comprising one of size, dimensions, theme, color, accent color, background image, or opacity; or modify the first layout based on a predefined theme.

* * * * *